CLIPPING LEVEL CONTROL APPARATUS

Filed Dec. 4, 1958 2 Sheets-Sheet 1

INVENTORS.
CHARLES E. BRANSCOMB
HAROLD F. MARTIN
BY Paul M. Brannen
AGENT

United States Patent Office 3,088,665
Patented May 7, 1963

3,088,665

CLIPPING LEVEL CONTROL APPARATUS

Charles E. Branscomb, Endwell, N.Y., and Harold F. Martin, San Jose, Calif., assignors to International Business Machines Corporation, New York, N.Y., a corporation of New York Filed Dec. 4, 1958, Ser. No. 778,197
13 Claims. (Cl. 235—61.11)

Figure 1:
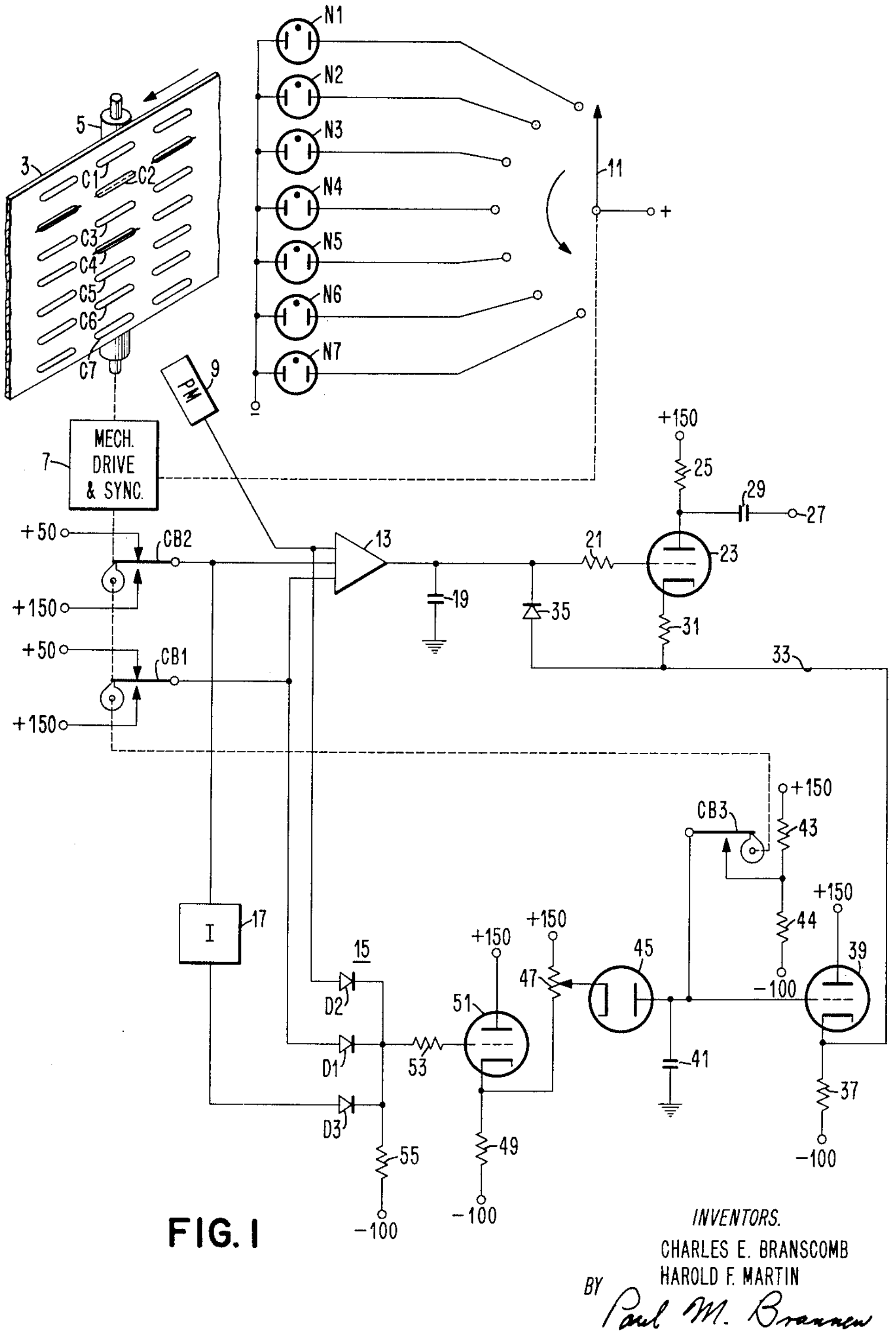

This invention relates to a clipping level control apparatus and particularly to an improved clipping level control apparatus in which identical sets of signals are derived in at least two operating cycles, and the clipping level for the signals following the first set is determined by the signal values obtained during the first cycle.

Although not limited thereto, the invention is particularly useful in test scoring apparatus in which it is desired to first determine the best "no mark" condition for a particular column of a test card, in order to subsequently analyze the column for the best "mark" condition. It has previously been proposed to provide test scoring apparatus in which answer cards are marked in a suitable location to indicate the selected answer, as in the well-known "multiple choice" or "true and false" type of examination. The marks on the cards may be sensed optically by providing a reading head, including a photoresponsive device and a plurality of illuminating lamps, one for each columnar position to be sensed. Suitable document transporting means advances the test card past the reading head, one column at a time. While each column is positioned under the head, the illuminating lamps are lighted sequentially, so that each columnar position is illuminated in turn. By means of suitable baffles, the light reflected from the document at each columnar position is supplied to the photoresponsive device, so that a series of signals are obtained from each column on the card, as the card is advanced in step-wise fashion past the reading head.

These signals, theoretically, vary only in accordance with the presence or absence of marks at the different columnar positions, and are supplied to suitable comparing circuits which determine whether or not the correct position has been marked by the examinee. However, since the marks are read by changes in reflected light, it is obvious that a clipping level must be set so that a tolerance is available on the signals. A manually set clipping level is relatively unsatisfactory since variations in the background color and reflectivity, changes in sensitivity of the photoresponsive device, etc., will not be compensated.

The present invention provides a novel clipping level control apparatus which automatically adjusts the clipping level of the scanned signals for each column. A first or preliminary set of signals is obtained, as by the scanning process previously described, and these signals are supplied to circuit means which changes the voltage across a capacitor to a value which is proportional to the limiting signal value supplied in the first set of signals. One or more subsequent sets of signals, similar to the first set, are obtained, as by subsequent successive scans of the same column, and are supplied to analyzing, comparing or other utilization circuits via a variable level control means, such as a controlled amplifier. The level of the signals passed by the variable level control means is determined by a control voltage supplied thereto from the capacitor. Prior to each cycle, the capacitor is reset to a predetermined level, so that the clipping level is set independently for each cycle.

It is accordingly a primary object of this invention to provide an improved clipping level control apparatus.

Another object of the invention is to provide an improved clipping level control apparatus in which two sets of similar signals, obtained during a single total cycle of operation, are utilized, the first for the purpose of determining the clipping level, and the second, governed by the clipping level, being used for analyzing purposes.

A further object of the invention is to provide an improved clipping level control apparatus in which a preliminary set of signals determines the charge upon a capacitor which then governs the level at which subsequent sets of signals, corresponding to the preliminary set, are passed to subsequent utilization circuits.

Still another object of the invention is to provide an improved clipping level control apparatus for setting a clipping level for repeated sets of similar signals.

Yet another object of the invention is to provide an improved clipping level control apparatus for setting a clipping level for a plurality of signals derived by successive scans of a record-bearing medium, in which the signals obtained by a preliminary scan are employed to set the clipping level for signals obtained during subsequent scans.

Other objects of the invention will be pointed out in the following description and claims and illustrated in the accompanying drawings, which disclose, by way of example, the principle of the invention and the best mode, which has been contemplated, of applying that principle.

Figure 2:
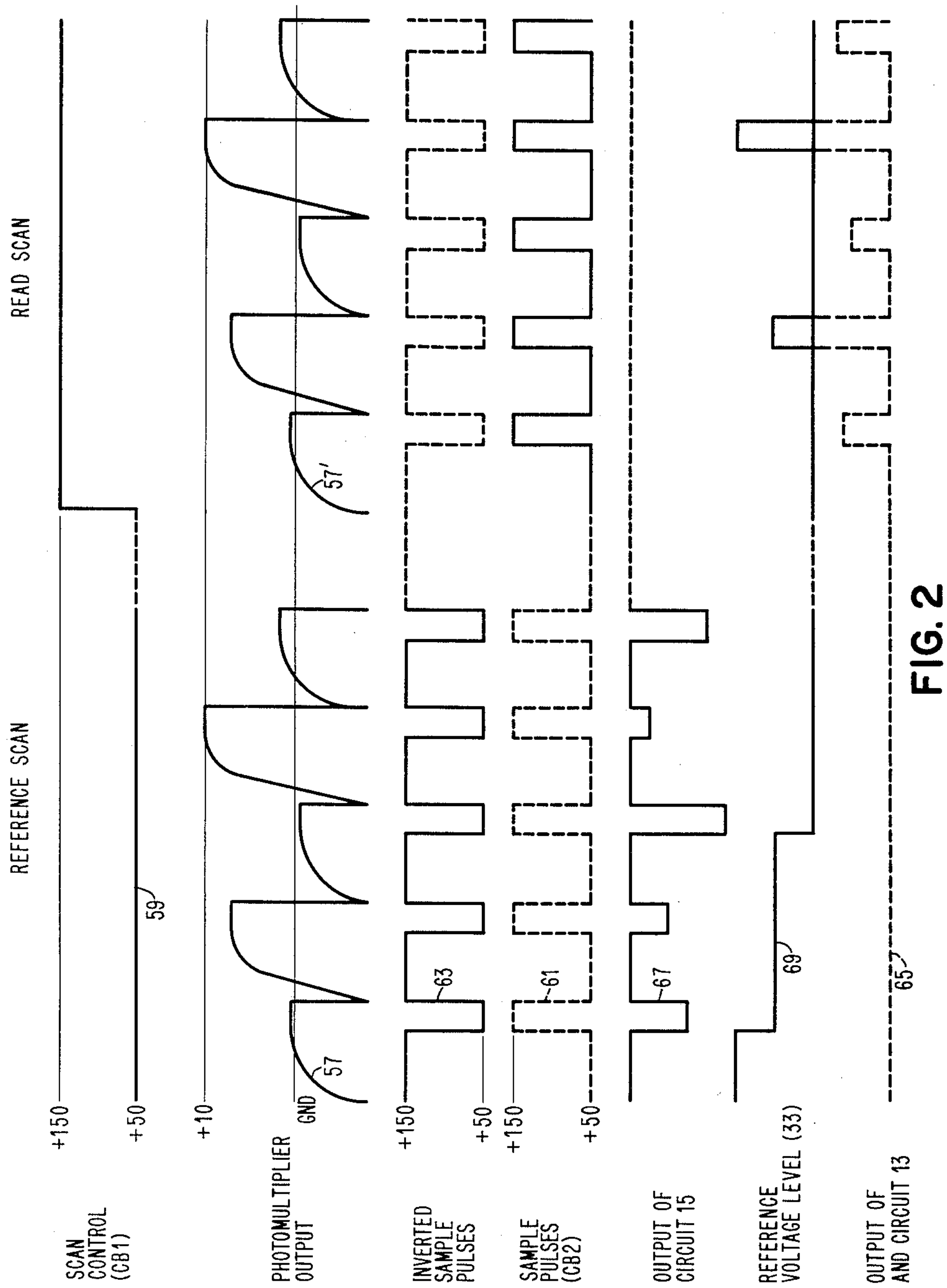

In the drawings:

FIG. 1 is a diagrammatic view of a portion of a test scoring apparatus employing a preferred embodiment of the invention; and FIG. 2 is a diagrammatic view of a number of waveforms obtained during operation of the apparatus shown in FIG. 1.

Referring now to FIG. 1, there is illustrated in schematic form, a portion of a test scoring apparatus embodying the present invention.

The test documents or cards are provided with a plurality of columns of marking spaces, each of which may constitute the marking area for a particular question. The examinee indicates his choice of the available answers by marking the proper position in the column, as by a pencil stroke. The card 3 in FIG. 1 is shown as having 7 positions or marking locations in each column, which are designated by the reference characters C1 through C7, reading from top to bottom, in the center column. The heavy solid line through space C4 in the center column and through the second space in the adjoining columns, indicates the positions selected by the person marking the card. The light dashed line through space C2 in the second column indicates an erasure, resulting from the examinee marking space C2, and thereafter changing his opinion, erasing the mark through C2, and marking space C4 instead.

The test cards or documents are moved step-by-step past a reading station by card transport means indicated diagrammatically by the feed roll 5, connected to common mechanical drive and synchronizing means 7. Since the actual form of the card transport means forms no part of the subject invention, it is deemed sufficient to point out that the test cards or documents are advanced in order, one column at a time, so that the columns are positioned and remain stationary for a predetermined time interval at the reading or scanning station.

The mechanical features of the optical reading head are not shown, for the sake of clarity, but the reading station or head comprises a plurality of light sources, one for each columnar position, such as the seven neon lamps designated by the reference characters N1 through N7, and a photoresponsive device, such as the photomultiplier tube 9. The parts are constructed and arranged, as by the use of suitable light baffles, so that each of the light sources N1 through N7 illuminates only the associated columnar position C1 through C7, but the reflected light from any of the columnar positions C1 through C7 is picked by the photomultiplier tube 9. It is obvious, therefore, that if the light sources are illuminated in sequence, a series of electrical pulses are supplied from the photomultiplier tube 9, the amplitude of which will depend upon the amount of light reflected at each columnar position, which in turn depends upon the reflectance of the background constituting the non-mark portion of the card, the presence or absence of a mark in the position, and the density of the mark.

Lamps N1 through N7 are illuminated in succession by connection across the terminals + and — of a suitable source of direct current, not shown, via the contacts of a stepping switch which includes a plurality of stationary contacts, one for each of the lamps, and a movable contact 11, which is driven from the mechanical drive and synchronizing means 7. It is apparent from the drawing that as the contact 11 is rotated in the direction shown, the lamps N1 through N7 will be illuminated in succession to successively iluminate the marking positions in each card column as previously explained. Contact 11 is synchronized and driven by the means 7 in such a manner that, during the time that each column is stopped at the reading station, the contact 11 is operated through two revolutions, so that two successive scans are made of each column. Other types of sequential controls, such as electronic ring circuits, can be used to govern the sequential illumination of the lamps.

The first scan is distinguished from the second scan, insofar as the apparatus is concerned, by a scan control pulse generated by operation of a circuit breaker CB1, which is arranged to operate its contact during the second scan only, for purposes to be described subsequently. During the first or preliminary scan, the normally closed contact of circuit breaker CB1 supplies a relatively low positive potential +50 volts, to one input of a three-way AND circuit, indicated symbolically at 13, and to one diode D1 of a three-way diode mixer or OR circuit 15.

The output of photomultiplier 9, is, after any required amplification, supplied to a second input of AND circuit 13 and to a diode D2 of OR circuit 15.

The remaining input to the circuitry of FIG. 1 is a sampling pulse designated as T1, supplied by the operation of a circuit breaker CB2, to the third and last input of AND circuit 13, and its inversion supplied through a conventional inverter 17 to a third diode D3 of OR circuit 15. The timing relationships and purposes of these pulses will be described subsequently.

The output of AND circuit 13 is supplied via a shunt smoothing capacitor 19 and a limiting resistor 21 to the grid of a controlled amplifier or clipping tube 23, the anode of which is connected to a positive potential terminal +150 via a load resistor 25, and to an output terminal 27 via a coupling capacitor 29. The cathode of tube 23 is connected via resistor 31 to a clipping control voltage lead 33, which is in turn connected to the grid of tube 23 via a clamping diode 35 and the limiting resistor 21. The voltage on lead 33 is that produced by the voltage drop across the cathode resistor 37 of a clipping level control tube 39, the anode of which is directly connected to +150, so that tube 39 and its connections function as a cathode follower. Conduction of tube 39 is governed by the voltage at its grid, which is connected to one plate of a reference capacitor 41, the other plate being connected to ground.

Just prior to a preliminary scan of a card column, the voltage across reference capacitor 41 is set to a predetermined reference potential, by operation of a circuit breaker CB3, which momentarily connects the high or ungrounded plate of capacitor 41 to a source of reference potential, here shown as a voltage divider comprising resistors 43 and 44 connected between +150 and —100.

The voltage across the reference capacitor is decreased during the first or primary scan by a discharging circuit including a discharge diode having its anode connected to capacitor 41 and having its cathode connected to the movable tap of a voltage divider comprising a potentiometer 47 and resistor 49 which are connected in series between +150 and —100. The mid-connection of resistor 49 and potentiometer 47 is connected to the cathode of a discharge control tube 51, the anode of which is directly connected to +150, so that tube 51 and its connections function as a cathode follower. The grid of tube 51 is connected via a limiting resistor 53 to the output of the mixer circuit 15, which output includes the load resistor 55.

Having thus described the essential features of the arrangement shown in FIG. 1, it is believed that the description of the invention will be enhanced by describing the manner of operation, making use of the timing and wave-form illustrations of FIG. 2.

As hereinbefore explained, the reference capacitor 41 is charged to a predetermined voltage level just prior to the preliminary scan operation for each column of the card, by the momentary closure of circuit breaker CB3.

With the card column stationary at the reading head, the switch 11 goes through its first operation, energizing lamps N1 through N7 in sequence, to produce output signals as shown at 57 in FIG. 2. These output signals are shown in FIG. 2 as they might appear for the first five marking positions of the center column of card 3 of FIG. 1. Note that the unmarked positions C1, C3 and C5 provide photomultiplier signals which are all at substantially the same level. The position C2, representing an erased mark, shows a relatively high output, and the marked position C4 provides the maximum level in the first series of signals provided by the preliminary or reference scan.

As previously explained, circuit breaker CB1 is unoperated during the first scan, and hence the output from this control is at a first voltage level, such as +50, during the first or preliminary scan, as shown by the left-hand portion of the waveform 59.

Since there is a time lag involved in the response of the photoresponsive device, the sampling pulses and their inversion, generated by operation of circuit breaker CB2, are provided to insure that the signals derived from the photomultiplier are utilized only after they have had sufficient time to reach the maximum possible amplitude for each signal, as can be seen by noting the time relationship of the photomultiplier signals to the CB2 pulses illustrated at 61, and the inverted form at 63.

During this preliminary scan, the input to AND circuit 13 from CB1 is at the low or +50 volt level, and hence even though signals are supplied to the AND circuit 13 from the photomultiplier and circuit breaker CB2, there is no output from AND circuit 13, as shown by the left-hand portion of the waveform 65.

At this time the input to diode D1 of circuit 15 is low, since CB1 is unoperated. The input to diode D3 is recurrently lowered by inverted pulses from inverter 17, and the input to diode D2 is varied in accordance with the level of the photomultiplier signals. The output from circuit 15 will accordingly consist of negative going pulses timed by the inverted sample pulses, and having negative going amplitudes determined by the inverse of the amplitude of the photomultiplier signals, that is, the low amplitude photomultiplier signals will produce high amplitude negative pulses from the circuit 15, and vice versa. These pulses are illustrated at 67.

The negative going pulses will, by control of cathode follower 51, cause the capacitor 41 to be discharged via diode 45, to a value proportional to the greatest negative going signal during the preliminary scan time. Reduction of the capacitor potential will, via cathode follower 39, cause a proportional reduction of the reference voltage on lead 33, as illustrated by waveform 69. In the example shown, the first pulse from circuit 15 lowers the reference voltage from the initial value to a first lower value. The second pulse is less negative than the first, in view of a higher output from the photomultiplier which results from the erased mark. Since the second pulse from circuit 15 is less negative than the first, the reference voltage remains unchanged. The third pulse from circuit 15 is more negative than either the first or second pulse, and hence it sets the reference voltage at another and lower value than that set by the first pulse. The fourth and fifth pulses, each being less negative than the third pulse, have no effect on the reference voltage level.

It can be seen therefore, that during the preliminary scan, the signals derived from optically scanning the card are sampled and cause the reference voltage level to be set in accordance with the least of the signal values obtained from the scanning, which may be said to constitute the best "no mark" condition on the card.

Since the discharging circuit for capacitor 41 includes a vacuum diode 45 having a substantially infinite reverse resistance, and since the reference voltage voltage lead 33 is coupled to capacitor 41 by means of the cathode follower 39, the voltage across capacitor 41 will remain substantially constant for a relatively long time at whatever value is obtained during the preliminary scanning operation, and hence the reference voltage level on lead 33 will also remain substantially constant during the subsequent read scan interval.

The voltage level on lead 33 determines the value of voltage which, applied to the grid of clipping tube 23, will cause conduction of the tube and a corresponding output signal at terminal 27. Diode 35 acts as a clamp which insures that the voltage at the grid of the tube 23 is always at least as positive as the potential on lead 33, so that the voltage supplied to the grid of tube 33 must rise above the reference voltage level to provide an output signal.

After the first or preliminary scan has been completed, and the reference voltage level has been set, as described above, the second or read scan is initiated. At the start of the second scan, the circuit breaker contact CB1 is operated and remains operated for the duration of the second scan interval, as shown by waveform 59. The voltage level of the input to AND circuit 13 from circuit breaker CB1 is accordingly raised, as is the voltage on diode D1. This action, in effect, disables the mixer or OR circuit 15 and opens AND circuit 13, so that the sampling pulses supplied from circuit breaker CB2 and the photomultiplier signals from photomultiplier 9 are passed, when in coincidence, to the output of AND circuit 13. The magnitude of the output will depend on the magnitude of the lowest signals supplied to circuit 13, i.e., the output signals will be proportional to the magnitude of the photomultiplier signals. On the other hand, the signals supplied to diodes D2 and D3 have no effect at this time, insofar as changing the voltage across capacitor 41 is concerned.

The photomultiplier signals during the second scan are substantially with those obtained during the first scan, since the same area on the card is involved. These signals are shown at the right-hand side of FIG. 2, and are designated by reference character 57'. This right-hand portion of FIG. 2 also shows the relation of the signals 57' to the signals 61 supplied by operation of circuit breaker CB2, which sample the signals 57' after sufficient time to account for the response lag of the photomultiplier tube.

The output of AND circuit 13 during the second or read scan will accordingly appear as shown by the wave-form 65, and comprises pulses occurring in synchronism with the sampling pulses 61, and having magnitudes proportional to the maximum magnitude of the photomultiplier signals during the sampling time intervals.

With the clipping level of tube 23 set to a particular level by the preliminary scan, only those pulses from AND circuit 13 which exceed this level will be passed to output terminal 27. In the example shown, the second and fourth pulses are indicated schematically as rising above the clipping level, and accordingly, will produce output pulses, while the first, third and fifth pulses do not have sufficient amplitude and hence produce no output pulses.

This completes one total cycle of the reading operation. The output pulses from terminal 27 are supplied to suitable analyzing apparatus which is not shown or described since it forms no part of the invention.

The card or document is now advanced by one column and the process described above is repeated, with similar following cycles until all of the card columns are scanned.

From the previous description, it is apparent that the present invention provides a new and useful arrangement for setting the clipping level of sets of varying signals which are repeated at least twice, by providing means responsive to the first set of signals for setting the value of a clipping control voltage and means governed by the clipping control voltage for clipping the subsequent sets of signals.

There are various modifications which can be made, which will be obvious to those skilled in the art. Transistors or other solid state devices may be readily substituted for the vacuum tubes shown and described. Also various other arrangements for sequentially optically scanning the card or document can be employed, such as mechanical scanners of the Nipkow disc type.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. Clipping level control apparatus for setting clipping levels for a set of signals supplied from a source of identical sets of signals, comprising a first circuit effective to receive the first set only of said sets of signals, amplitude responsive means connected to said first circuit for determining the value of the minimum of said signals, a second circuit effective to receive all but the first set of said sets of signals, and clipping means connected to said second circuit and governed by said amplitude responsive means for clipping the signals supplied to said second circuit.

2. Clipping level control apparatus for setting clipping levels for a set of signals supplied from a source of identical sets of signals, comprising a first circuit effective to receive the first set only of said sets of signals, peak voltage determing means connected to said first circuit for determining the amplitude of the minimum of said first set of signals, storage means connected to said peak voltage determining means for storing a control voltage proportional to said amplitude, a second circuit effective to receive all but the first set of said signals, and signal level control means connected to said second circuit and governed by said control voltage.

3. Clipping level control apparatus for setting clipping levels for a set of signals supplied from a source of identical sets of signals, comprising, switching means for supplying the first set only of said sets of signals to a first circuit and for supplying all sets of signals subsequent to said first set to a second circuit, said first circuit having amplitude responsive means connected thereto for determining the value of the minimum of said signals, and clipping means connected to said second circuit and governed by said amplitude responsive means for clipping the signals supplied to said second circuit.

4. Clipping level control apparatus for setting clipping levels for a set of signals supplied from a source of identical sets of signals, comprising, switching means for supplying the first set only of said sets of signals to a first circuit and for supplying all sets of signals subsequent to said first set to a second circuit, peak voltage determining means connected to said first circuit for determining the value of the minimum of said signals, storage means connected to said peak voltage determining means for storing a control voltage proportional to said value of said minimum signal, and clipping means connected to said second circuit and governed by said control voltage for clipping the signals supplied to said second circuit.

5. Clipping level control apparatus for setting clipping levels of a set of signals supplied from a source of identical sets of signals, comprising switching means for supplying the first set only of said sets of signals to a first circuit and for supplying all sets of signals subsequent to said first set to a second circuit, peak voltage determining means connected to said first circuit for determining the value of the minimum of said signals, storage means including a capacitor connected to said peak voltage determining means for storing a control voltage proportional to said valve of said minimum signal, and clipping means connected to said second circuit and governed by said control voltage for clipping the signals supplied to said second circuit.

6. Clipping level control apparatus for setting clipping levels for a set of signals supplied from a source of identical sets of signals, comprising switching means for supplying the first set only of said sets of signals to a first circuit and for supplying all sets of signals subsequent to said first set to a second circuit, peak voltage determining means connected to said first circuit for determining the value of the minimum of said signals, a reference capacitor, means for establishing an initial potential across said capacitor, means governed by said peak voltage determining means for changing the potential across said capacitor in accordance with the value of the minimum of said first set of signals, and clipping means connected to said second circuit governed by the potential across said capacitor for variably clipping the signals supplied to said second circuit.

7. Clipping level control apparatus for setting clipping levels for a set of signals supplied from a source of identical sets of signals, comprising switching means for supplying the first set only of said sets of signals to a first circuit and for supplying all sets of signals subsequent to said first set to a second circuit, peak voltage determining means connected to said first circuit for determining the value of the minimum of said signals, a reference capacitor, means for initially charging said capacitor to a predetermined potential, means controlled by said peak voltage determining means for discharging said capacitor to a value proportional to said value of the minimum of said first set of signals, and clipping means connected to said second circuit and governed by the potential across said capacitor for variably clipping the signals supplied to said second circuit.

8. Clipping level control apparatus for setting clipping levels for a set of signals supplied from a source of identical sets of signals, comprising means responsive to the first set of signals for establishing a control voltage, the magnitude of which is proportional to the desired clipping level, and clipping means governed by said control voltage for clipping the signals in each set of signals subsequent to the first set.

9. In a machine for analyzing a plurality of positions in record media for the presencec or absence of record indicia, including scanning means for scanning said record media and providing electrical signals, the magnitude of which varies with the presence or absence of said record indicia, the relative density of said indicia, and with background conditions of said record media, clipping level control means for setting a clipping level for said signals comprising scan control means for governing said scanning means to perform at least two scanning cycles through each group of positions in said media to thereby provide a preliminary scan and at least one subsequent scan, switching means synchronized with said scan control means, a first circuit governed by said switching means and effective to receive signals from said scanning means during said preliminary scan only, a second circuit governed by said switching means and effective to receive signals from said scanning means during said subsequent scans only, amplitude responsive means connected to said first circuit for determining amplitude of the minimum of said signals supplied to said first circuit, and clipping means connected to said second circuit and governed by said amplitude responsive means for clipping the signals supplied to said second circuit.

10. In a machine for analyzing a plurality of positions in record media for the presence or absence of record indicia, including scanning means for scanning said record media and providing electrical signals, the magnitude of which varies with the presence or absence of said record indicia, the relative density of said indicia, and with background conditions of said record media, clipping level control means for setting a clipping level for said signals comprising scan control means for governing said scanning means to perform at least two scanning cycles through each group of positions in said media to thereby provide a preliminary scan and at least one subsequent scan, switching means synchronized with said scan control means, a first circuit governed by said switching means and effective to receive signals from said scanning means during said preliminary scan only, a second circuit governed by said switching means and effective to receive signals from said scanning means during said subsequent scans only, peak voltage determining means connected to said first circuit for determining the amplitude of the minimum of the signals during said preliminary scan, storage means connected to said peak voltage determining means for storing a control voltage proportional to said maximum amplitude, and signal level control means connected to said second circuit and governed by said control voltage.

11. A clipping level control apparatus as claimed in claim 10, in which the storage means includes a reference capacitor connected to said peak voltage determining means.

12. In a machine for analyzing a plurality of positions in record media for the presence or absence of record indicia, including scanning means for scanning said record media and providing electrical signals, the magnitude of which varies with the presence or absence of said record indicia, the relative density of said indicia, and with background conditions of said record media, clipping level control means for setting a clipping level for said signals comprising scan control means for governing said scanning means to perform at least two scanning cycles through each group of positions in said media to thereby provide a preliminary scan and at least one subsequent scan, switching means synchronized with said scan control means, a first circuit governed by said switching means and effective to receive signals from said scanning means during said preliminary scan only, a second circuit governed by said switching means and effective to receive signals from said scanning means during said subsequent scans only, peak voltage determining means connected to said first circuit for determining the value of the minimum of said signals during said preliminary scan, a reference capacitor, means for establishing an initial potential across said capacitor, means governed by said peak voltage determining means for changing the potential across said capacitor in accordance with the value of said minimum signal during said first scan, and clipping means connected to said second circuit and governed by the potential across said capacitor for variably clipping the signals supplied to said second circuit.

13. In a machine for analyzing a plurality of positions in record media for the presence or absence of record indicia, including scanning means for scanning said record media and providing electrical signals, the magnitude of which varies with the presence or absence of said record indicia, the relative density of said indicia, and with background conditions of said record media, clipping level control means for setting a clipping level for said signals comprising scan control means for governing said scanning means to perform at least two scanning cycles through each group of positions in said media to thereby provide a preliminary scan and at least one subsequent scan, switching means synchronized with said scan control means, a first circuit governed by said switching means and effective to receive signals from said scanning means during said preliminary scan only, a second circuit governed by said switching means and effective to receive signals from said scanning means during said subsequent scans only, peak voltage determining means connected to said first circuit for determining the amplitude of the minimum of said signals during said preliminary scan, a reference capacitor, means for initially charging said capacitor to a predetermined potential, means controlled by said peak voltage determining means for discharging said capacitor to a value proportional to said amplitude of said minimum signal, and clipping means connected to said second circuit and governed by the potential across said capacitor for variably clipping the signals supplied to said second circuit.

References Cited in the file of this patent

UNITED STATES PATENTS

| | | |
|---|---|---|
| 2,345,026 | Boykin | Mar. 28, 1944 |
| 2,377,783 | Hood | June 5, 1945 |
| 2,566,942 | Keen | Sept. 4, 1951 |
| 2,569,840 | Whalen et al. | Oct. 2, 1951 |
| 2,690,222 | Wilson et al. | Sept. 28, 1954 |
| 2,855,513 | Hamburgen et al. | Oct. 7, 1958 |
| 2,894,248 | Relis et al. | July 7, 1959 |